United States Patent [19]
Ishii

[11] Patent Number: 6,013,233
[45] Date of Patent: Jan. 11, 2000

[54] ELECTROSTATIC TREATMENT ELECTRODE

[76] Inventor: Ishio Ishii, 15-8, Tsukushino 2-chome, Machida-shi, Tokyo 194, Japan

[21] Appl. No.: 08/943,616

[22] Filed: Oct. 3, 1997

[51] Int. Cl.$^7$ ............................. B01J 19/08; B01J 19/12
[52] U.S. Cl. ....................................... 422/186.04
[58] Field of Search ...................... 422/186.04; 204/286, 204/275, 290 R, 288, 289, 297 R

[56] References Cited

U.S. PATENT DOCUMENTS

| | | | |
|---|---|---|---|
| 3,984,304 | 10/1976 | Rahn ........................................ | 204/286 |
| 3,997,421 | 12/1976 | Perri et al. ............................... | 204/267 |
| 4,545,887 | 10/1985 | Arnesen et al. . | |

*Primary Examiner*—Kathryn Gorgos
*Assistant Examiner*—Wesley A. Nicolas
*Attorney, Agent, or Firm*—Flynn, Thiel, Boutell & Tanis, P.C.

[57] ABSTRACT

Electrostatic treatment of a liquid is increased by increasing a surface area of an electrostatic treatment electrode which contacts the liquid, by reducing flow resistance of the electrode in the liquid, and by rectifying the flow of the liquid. The electrostatic treatment electrode comprises a plurality of metal elongate members each having an insulating film. A resin block receives the elongate members therethrough to support them in parallel. A metal boss receives the resin block therein. A connector electrically connects one end of each of the elongate members to a high voltage power source. A filling resin fills up at least part of the interior of the metal boss to support and insulate the ends of the elongate members with respect to each other. A protection cap supports the other ends of the elongate members in a cantilevered arrangement. As the number of elongate members increases, the magnitude of the electrostatic field generated in the fluid is increased.

5 Claims, 7 Drawing Sheets

ELECTROSTATIC TREATMENT ELECTRODE

BACKGROUND OF THE INVENTION

1. Field of the Invention

The present invention relates to an electrode for electrostatic treatment of water (hereinafter referred to as electrostatic treatment electrode) used for preventing generation of scale to be stuck to piping or heat exchangers in a system for circulating, supplying or discharging fluid, particularly in a cold/warm water supply system or in an air conditioner system, and for decomposing the scale accumulated in the piping, etc. and discharging the scale.

2. Prior Art

Much attention is recently focused on electrostatic water treatment as a physical water treatment, and an electrode for electrostatic treatment electrode disclosed in U.S. Pat. No. 4,545,887 is known as a concrete device. That is, this electrode is disposed in a tank or in piping in a state to be insulated from water, and a high voltage is applied to this electrode for preventing generation of scale or for decomposing scale accumulated in the tank or piping and discharging such scale. However, since the electrostatic treatment electrode disclosed in U.S. Pat. No. 4,545,887 is formed of a single pipe as a whole, if this electrode is disposed in the piping, a water passage becomes narrow which causes a pump to labor and disturb a stream of water, so that there is a possibility that the electrostatic treatment effect can not be exerted sufficiently. Further, there are problems that the surface area of the electrode which contacts water has to be increased for performing the electrostatic water treatment with high efficiency and the structure thereof has to be simplified for reducing cost thereof.

SUMMARY OF THE INVENTION

The present invention has been made in view of the problems set forth above, and it is an object of the invention to provide an electrostatic treatment electrode having a large surface area which contacts water for performing electrostatic water treatment with high efficiency, for reducing resistance of the electrode in fluid, and for rectifying the flow of fluid so as to perform electrostatic water treatment with high efficiency, and for simplifying the structure thereof.

To achieve the above object, the electrostatic treatment electrode of the present invention is characterized in comprising a plurality of metal elongate members each having an insulating film which are arranged in parallel with one another and held at one end thereof where the elongate members are connected to a high voltage power source.

In more detail, the electrostatic treatment electrode of the present invention comprises a plurality of metal elongate members each having an insulating film, a resin block which supports the electrodes therein to arrange them in parallel with one another so as to hold them, a metal boss for receiving the resin block therein, a connecting means for electrically connecting each end of the elongate members which extend through and are supported in the resin block and connected to a high voltage power source, and filling resin for filling up a space defined in the rear portion of the metal boss to fix each rear end of the elongate members while they are insulated from one another. It is needless to say that the elongate members may be fixed to the metal boss in an insulating state by the filling resin alone without using the resin block.

The elongate members are formed of metals having high conductivity such as aluminum alloy, stainless steel, and they may have a flat-plate shape, a pipe shape, and a rod shape. An insulating film is formed on the elongate members by coating each surface of the elongate members with a resin film or resin.

It is preferable that a protection cap be fixed to the tip end of each elongate member. If the protection cap is fixed to the tip ends of the elongate members in a manner that the tip ends of the elongate members are connected to one another, the elongate members keep in parallel with one another, and vibration and resonance can be prevented.

Since the electrostatic treatment electrode of the present invention comprises a plurality of metal elongate members each having an insulating film, the surface area of the electrostatic treatment electrode can be increased compared with the conventional pipe-shaped electrostatic treatment electrode by increasing the number of the elongate members. Even if the entire size of the electrostatic treatment electrode is the same as that of the conventional pipe-shaped electrostatic treatment electrode, the resistance of the electrostatic treatment electrode in the fluid can be reduced by a large amount so that the flow of fluid is rectified and electrostatic treatment effect can be exerted when the elongate members are arranged in parallel with one another. Further, the electrostatic treatment electrode is simply structured by merely supporting a plurality of elongate members in the boss through the resin block pressed therein.

PREFERRED EMBODIMENT OF THE INVENTION

Figure 1:
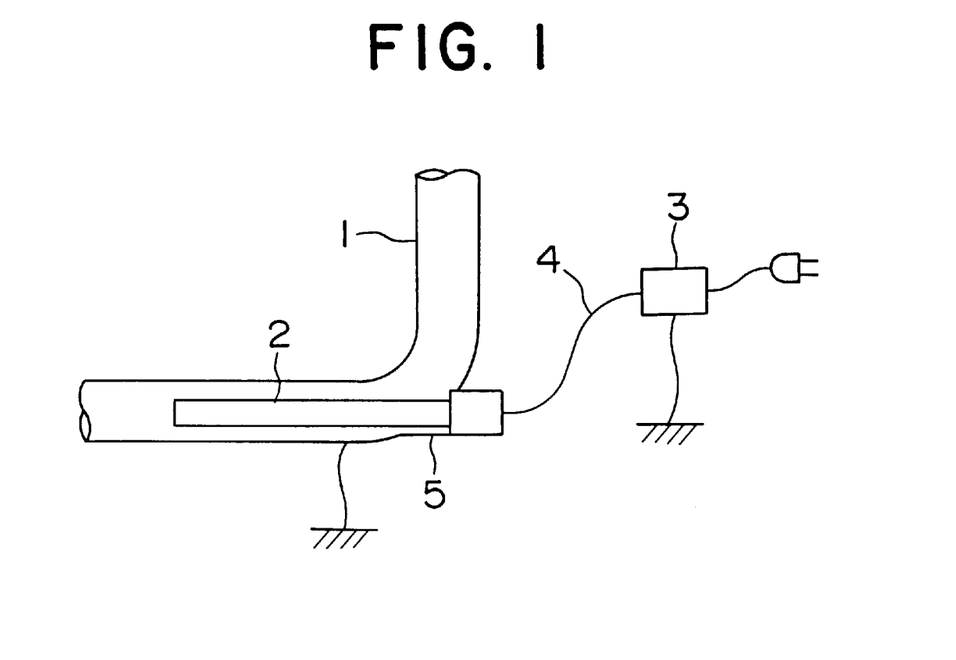
FIG. 1 is a view for explaining how to secure an electrostatic treatment electrode to a pipe according to the present invention.
Figure 2:
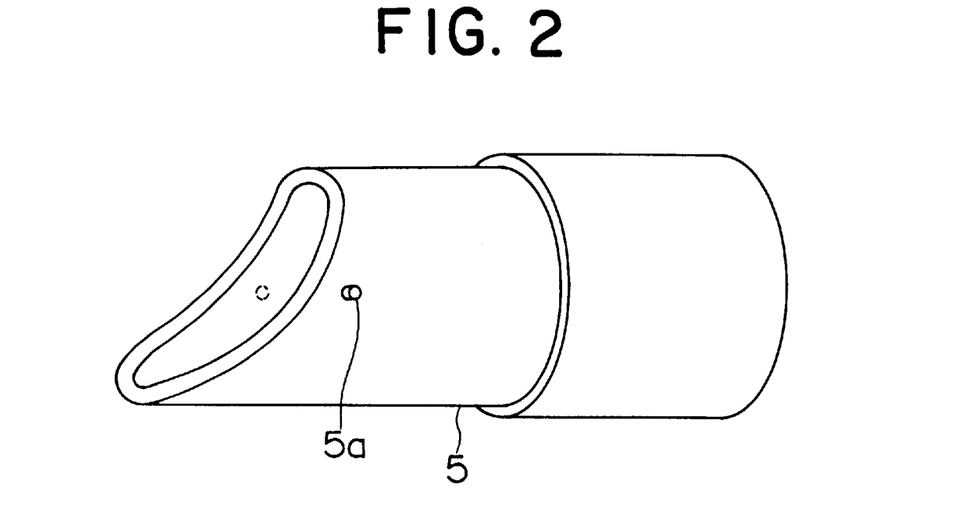
FIG. 2 is a perspective view of a socket for securing the electrostatic treatment electrode to the pipe.

In FIG. 1, denoted by 1 is a pipe 1 through which cold or warm water passes in a cold/warm water supply system or an air conditioner system used in a building or a plant, and an electrostatic treatment electrode 2 is fixed to a socket 5 which is welded to an elbow portion of the pipe 1. The socket 5 having a predetermined length and protrusions 5a welded thereto, shown in FIG. 2, is specially manufactured so that the electrostatic treatment electrode 2 can be precisely and simply fixed to the pipe 1. The tip end curved portion of the socket 5 is brought into contact with the pipe 1 at the portion to which the socket 5 is fixed, and the precise boring position is marked on the pipe 1, then the pipe 1 is bored. The socket 5 is welded to the pipe 1 at the protrusions 5a which maintain the depth of the electrostatic treatment electrode relative to the socket 5. The socket 5 is machined to have a screw portion into which the electrostatic treatment electrode 2 is screwed so as to be fastened by the socket to be positioned in a given direction. The pipe 1 is made of a metal tube and serves as an earth electrode relative to the electrostatic treatment electrode 2 serving as a positive electrode.

If a single phase power an AC of 110 V/220 V is set to a high voltage power source 3 provided with a safety device, the AC power is converted into a high voltage DC (e.g., 10000 V, 1 mA) so that a positive high voltage is applied to the electrostatic treatment electrode 2 through a high voltage cable 4. An electrostatic field is formed in water by the application of high voltage so that organic or inorganic dissolved molecules and positive and negative ions contained in water are respectively enclosed by a molecule of water at the peripheries thereof and they flow. The positive ion is drawn toward a negatively charged pipe wall but not attracted by or adsorbed on the pipe wall, and also the negative ion is repulsed and it is not drawn to the pipe wall so that the positive and negative ions are separated from each other, and hence no scale is generated. The negative ion is also not at all adsorbed on the positive electrode like the positive ion and flows in the pipe, while the positive ion is repulsed so that the positive and negative ions are separated from each other. Accordingly, scale is prevented from being generated while the electrostatic field is present. Further, even if the scale is adsorbed on the pipe wall, such a scale is subjected to a weak electrolysis by the electric field, so that it is gradually decomposed and discharged. There does not occur a phenomenon that free electrons are discharged from the positive electrode and discharged in water. The flow of fluid is rectified in the electrostatic field, and the electrostatic treatment is effective as the surface area of the positive electrode is large.

Figure 3:
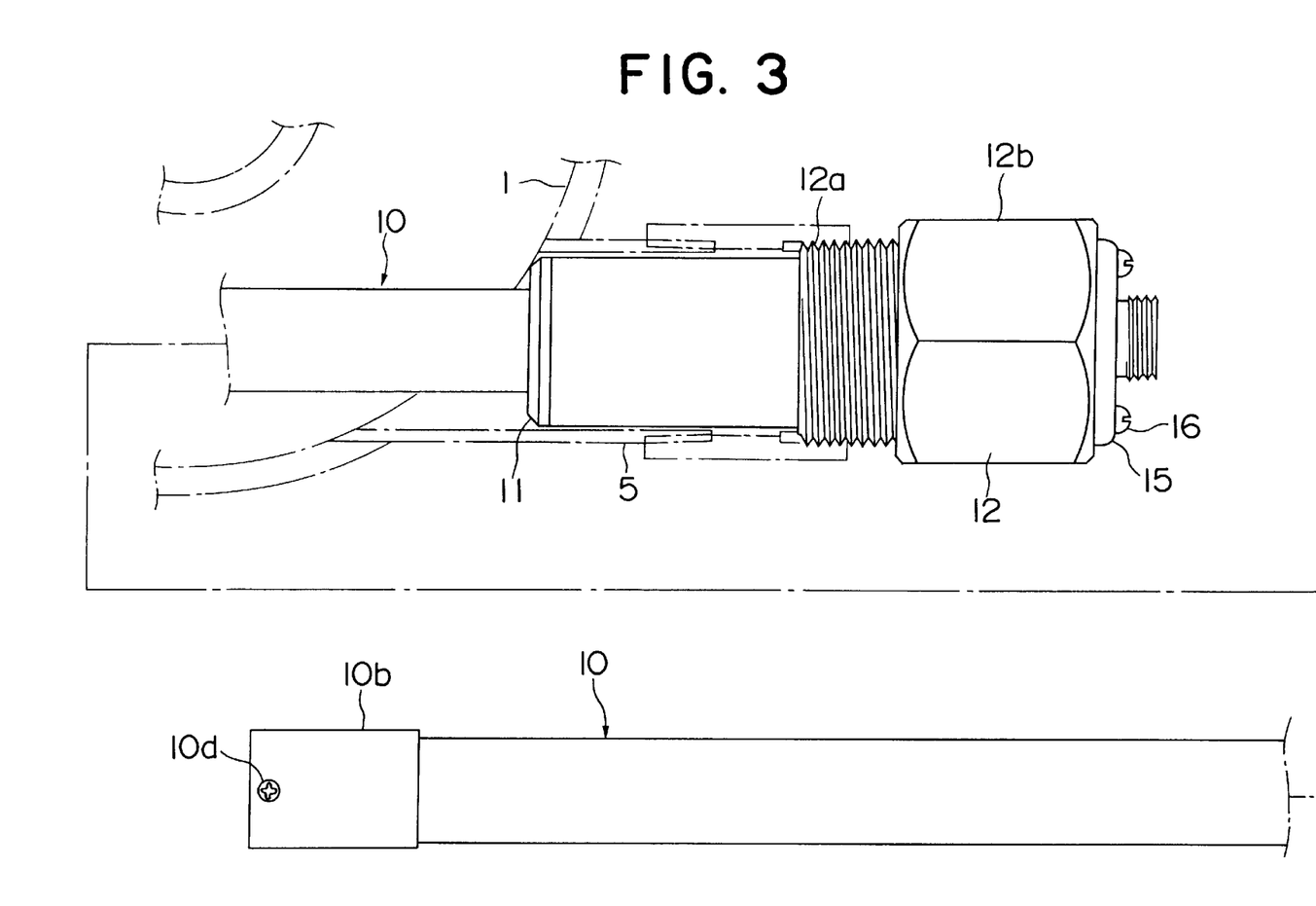
FIG. 3 is a side view of the electrostatic treatment electrode according to a first embodiment of the invention.
Figure 4:
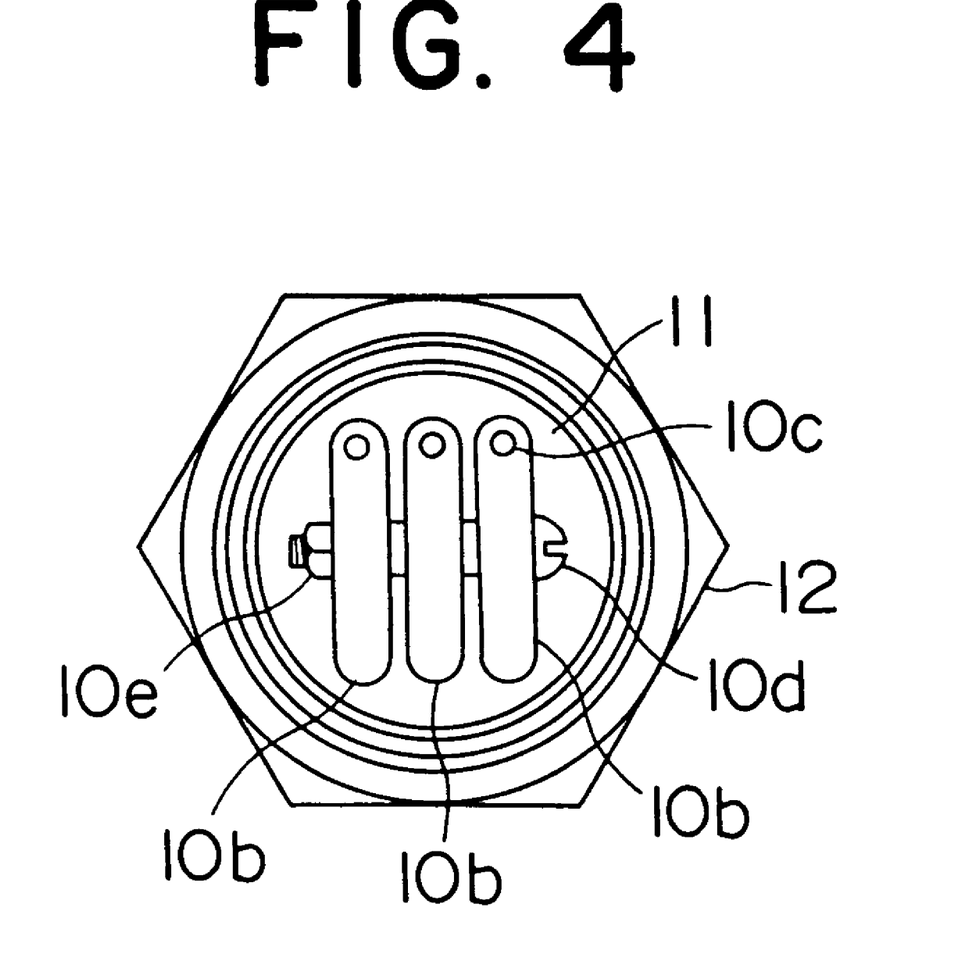
FIG. 4 is a front view of the electrostatic treatment electrode of FIG. 3.
Figure 5:
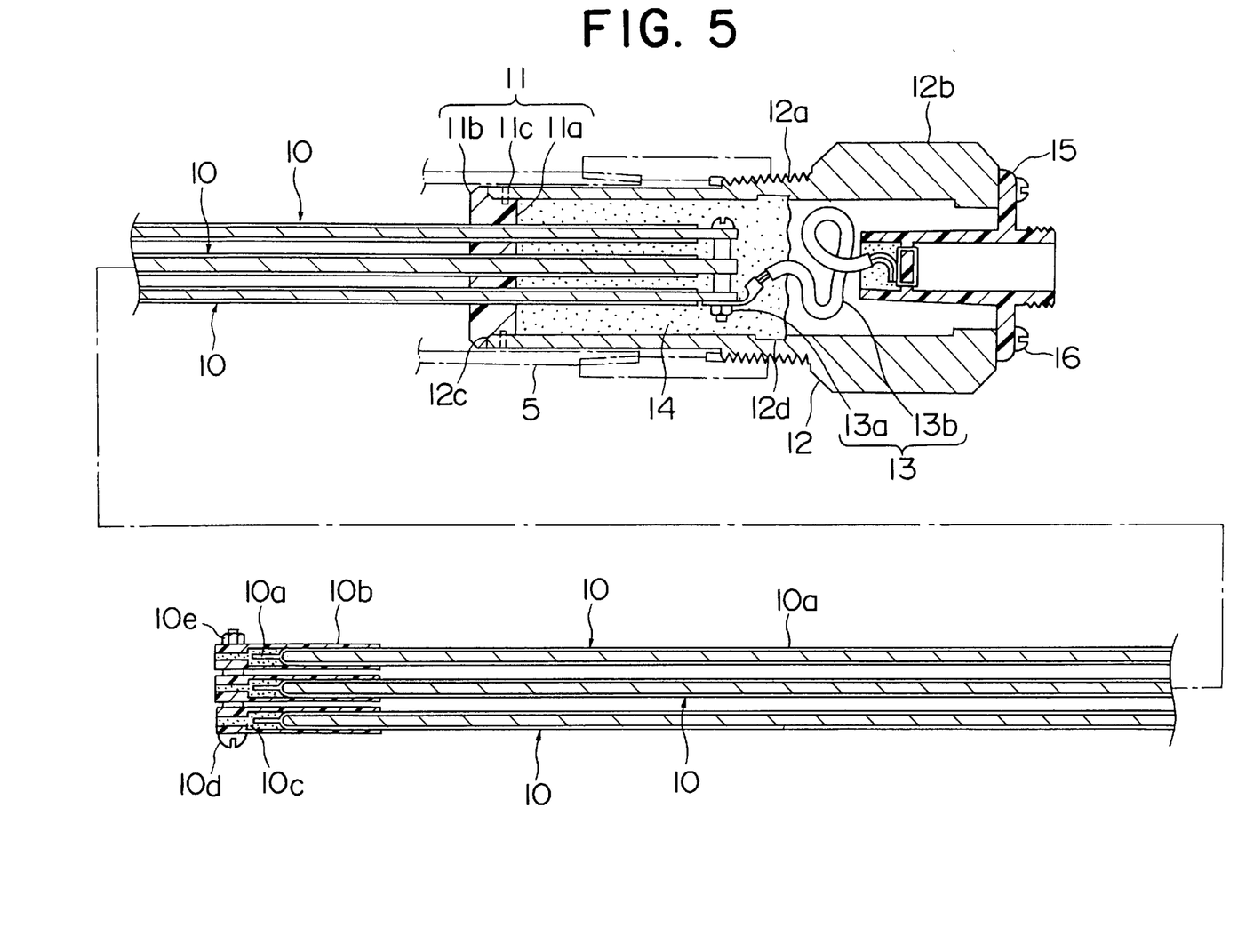
FIG. 5 is a sectional view of the electrostatic treatment electrode of FIG. 3.

First Embodiment (FIGS. 3 to 5)

The electrostatic treatment electrode comprises three pieces of belt-shaped metal plates 10, a resin block 11 which supports therethrough the metal plates 10 to support them in a parallel with one another and to hold them. A metal boss 12 receives the resin block 11 therein, and a connecting means 13 comprising a connecting member 13a and a connecting line 13b connects each rear end of the metal plates 10 which extend through the resin block 11 to a single high voltage cable 4. Filling resin 14 fills up a space defined in the rear portion of the boss 12 and fixedly support the rear portions of the metal plates 10 in an insulated state.

Each metal plate 10 is formed of a metal having a good conductivity such as aluminum alloy and a stainless steel. In the first embodiment, one piece of a central metal plate 10 is thicker than two other metal plates 10, thereby differentiating a natural frequency of the central plate 10 from that of the outside metal plates 10 for preventing the entire resonance. The metal plates 10 are chamfered at the corners thereof except the portion to which the connecting means 13 is fixed. Then an insulating films 10a are provided on the surfaces of the metal plates 10. Each insulating film 10a is formed of a tube made of a material which is high in breakdown voltage and low in dielectric constant and is excellent in weather resistance, water resistance, and heat resistance, and can be heat-sealed, i.e., made of a thermoplastic resin mainly composed of fluorocarbon resin such as perfluoroethylene propylene copolymer (FEP), perfluoroalkoxyalkane (PFA), and the tube is subjected to heat contraction while each metal plate 10 is covered with the tube. Experimentally, the insulating film 10a is enough to have a thickness of 0.1 mm if a current of 1 mA is applied thereto, even if a high voltage is 10 kV. It is preferable that the thickness ranges from 0.4 to 0.5 mm considering the strength thereof in practical use. After the insulating film 10a is subjected to heat contraction, it is heat-sealed at the tip end thereof and is closed. Then a protection cap 10b is attached to the tip end of the insulating film 10a by way of an adhesive 10c such as epoxy resin (EP), and the metal plates 10 are connected to one another at the tip ends thereof by a bolt 10d and a nut 10e. The protection cap 10b supports the metal plates 10 in a cantilevered arrangement shown in FIG. 1. The protection cap 10b is formed of adhesive resin having weather resistance, water resistance, and heat resistance, e.g., polyvinylidenefluoride (PVDF), polysulfone (PSF), and polycarbonate (PC). Alternatively, protection cap 10b is formed of a metal such as a stainless steel or a brass.

The resin block 11 is formed of engineering plastics having weather resistance, water resistance, and heat resistance such as polyvinylidenefluoride (PVDF), polysulfone (PSF), silicon resin (SI). Three through holes are defined in the resin block 11 through which the metal plates 10 coated with the insulating film 10a are inserted without generating a gap between these holes and the metal plates 10. After three metal plates 10 are inserted into and through the through holes, the rear ends of the metal plates 10 are fixed and electrically connected to one another by the connecting member 13a which is attached to the connecting line 13b.

The boss 12 is formed of a metal such as brass or an engineering plastic such as polyphnylene sulfide (PPS), polyether ether ketone (PEEK) and is hollow. A tapered screw 12a and a hexagonal screw head 12b are provided at the outer periphery of the boss 12. The metal plates 10 of the electrostatic treatment electrode 2 are inserted into the socket 5 which is secured to the elbow portion of the pipe 1 by electric welding, etc. The screw 12a is screwed into a male screw provided on the inner surface of the socket 5, thereby fixing the electrostatic treatment electrode 2 to the socket 5. In this case, the screw 12a is screwed into the socket 5 while a seal tape is wound around the screw 12a, so as to fix the electrostatic treatment electrode 2 to the socket 5 in a state where the former is sealed and positioned in a predetermined direction relative to the latter. It is preferable that a proper mark be put on the head 12b of the boss 12 for position purpose.

The resin block 11 comprises an outer diameter insertion portion 11a which is slightly greater than an inner diameter of the boss 12, and a cap portion 11b which is positioned at the back of the insertion portion 11a and is greater than the insertion portion 11a. Accordingly, when the insertion portion 11a is inserted into the boss 12 in a predetermined direction, the resin block 11 firmly engages an inner surface of the boss 12 while the cap portion 11b is brought into contact with the tip end of the boss 12. It is preferable that the resin block 11 be fixed to the boss 12 by an embedding screw 11c so as to not come off therefrom. A tapered expansion portion 12c is formed on the boss 12 at the tip end thereof to facilitate the insertion of the resin block 11 when the resin block 11 is inserted into the boss 12. Further, if the boss 12 is preheated, the resin block 11 can be easily inserted into the boss 12, and it can be firmly fixed to the boss 12 since the boss 12 contracts when it gets cold.

The metal plates 10 can be secured to the boss 12 while the former protrude from the latter by merely pressing and fitting the resin block 11 into the boss 12. As a result, the structure is simplified and the parts to be used are reduced, also the manufacturing process can be sharply simplified, and further, the manufacturing cost can be reduced.

After the resin block 11 having the metal plates 10 engages in the boss 12 so as to fix the former to the latter, the filling resin 14 such as epoxy resin (EP) is poured through the back of the boss 12, thereby surely fixing each rear end portion of the metal plates 10 together with the connecting means 13 while they are insulated from one another. The other end of the connecting line 13b, attached to the connecting member 13a, is secured to a high voltage connector 15, and the high voltage connector 15 is fixed to the boss 12 by screws 16. Denoted by 12d in FIG. 5 is a cut expansion portion for preventing the filling resin 14 from coming off.

Figure 6:
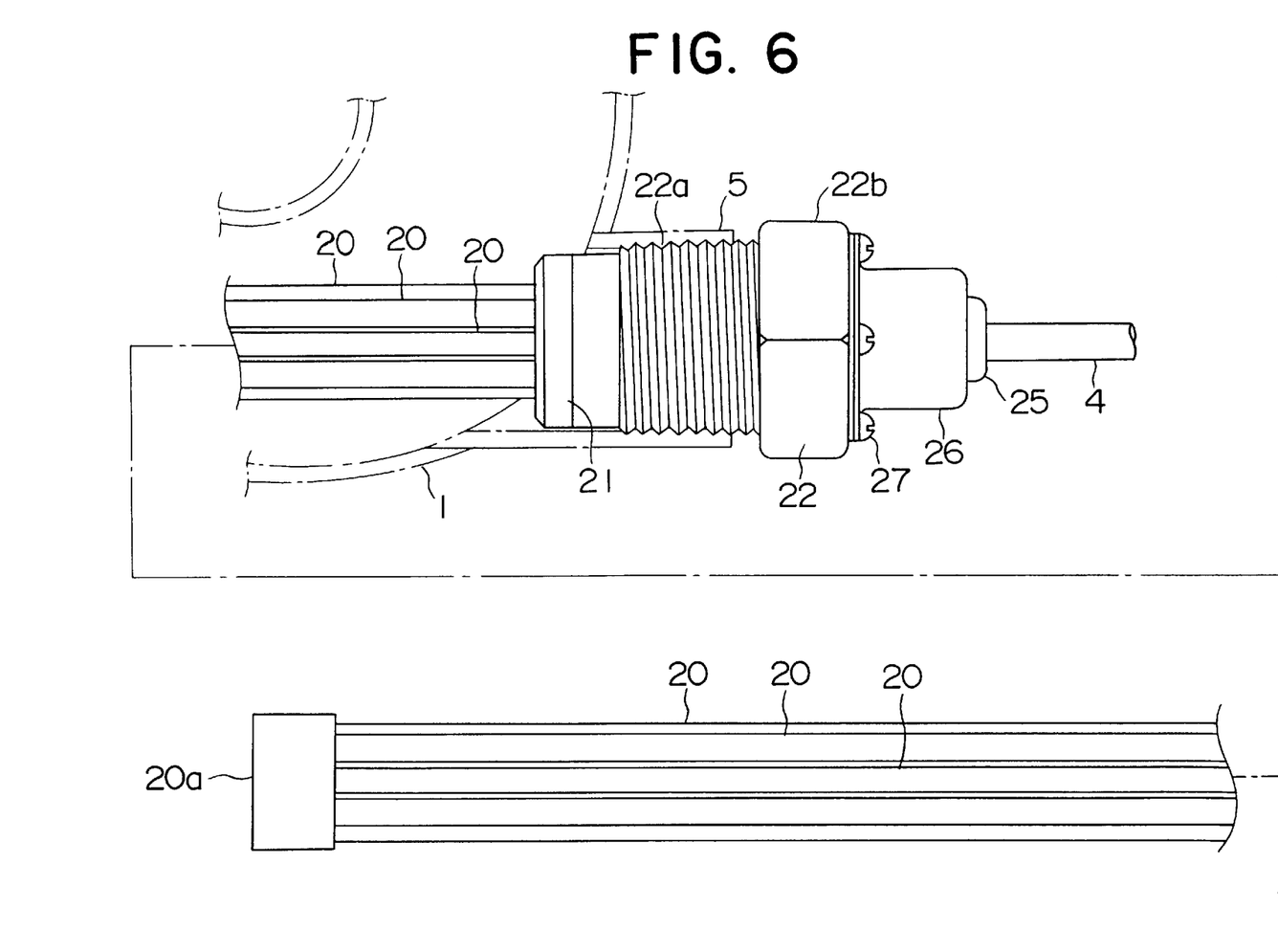
FIG. 6 is a side view of the electrostatic treatment electrode according to a second embodiment of the invention.
Figure 7:
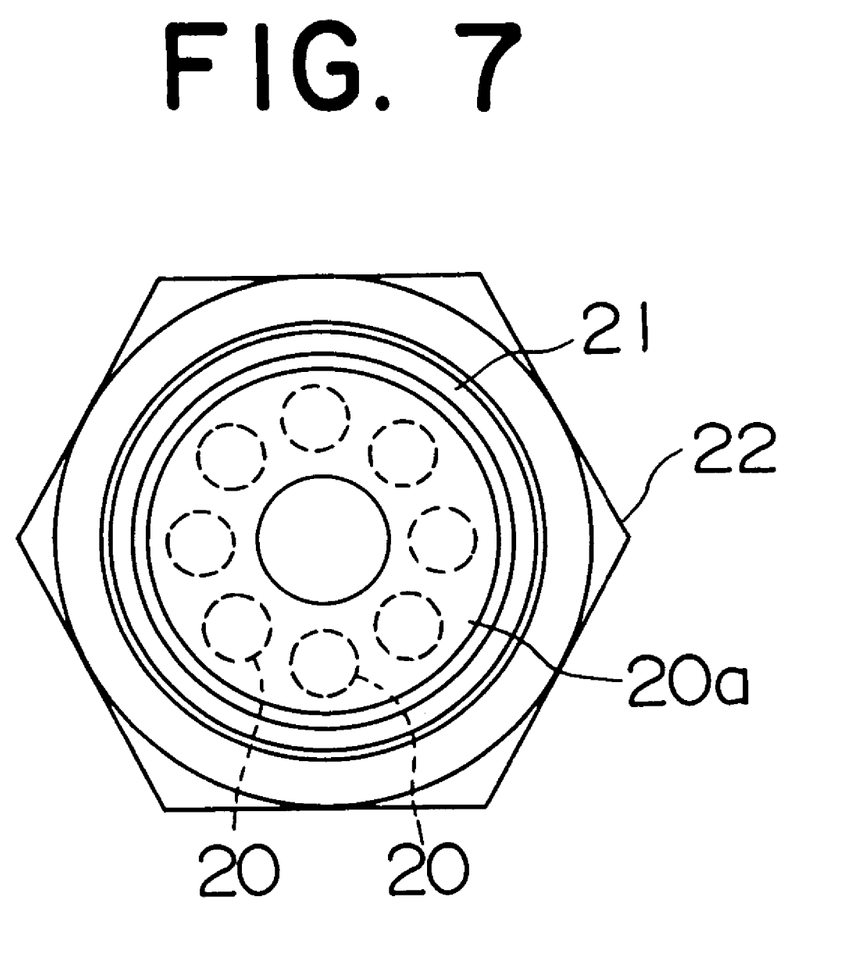
FIG. 7 is a front view of the electrostatic treatment electrode of FIG. 6.
Figure 8:
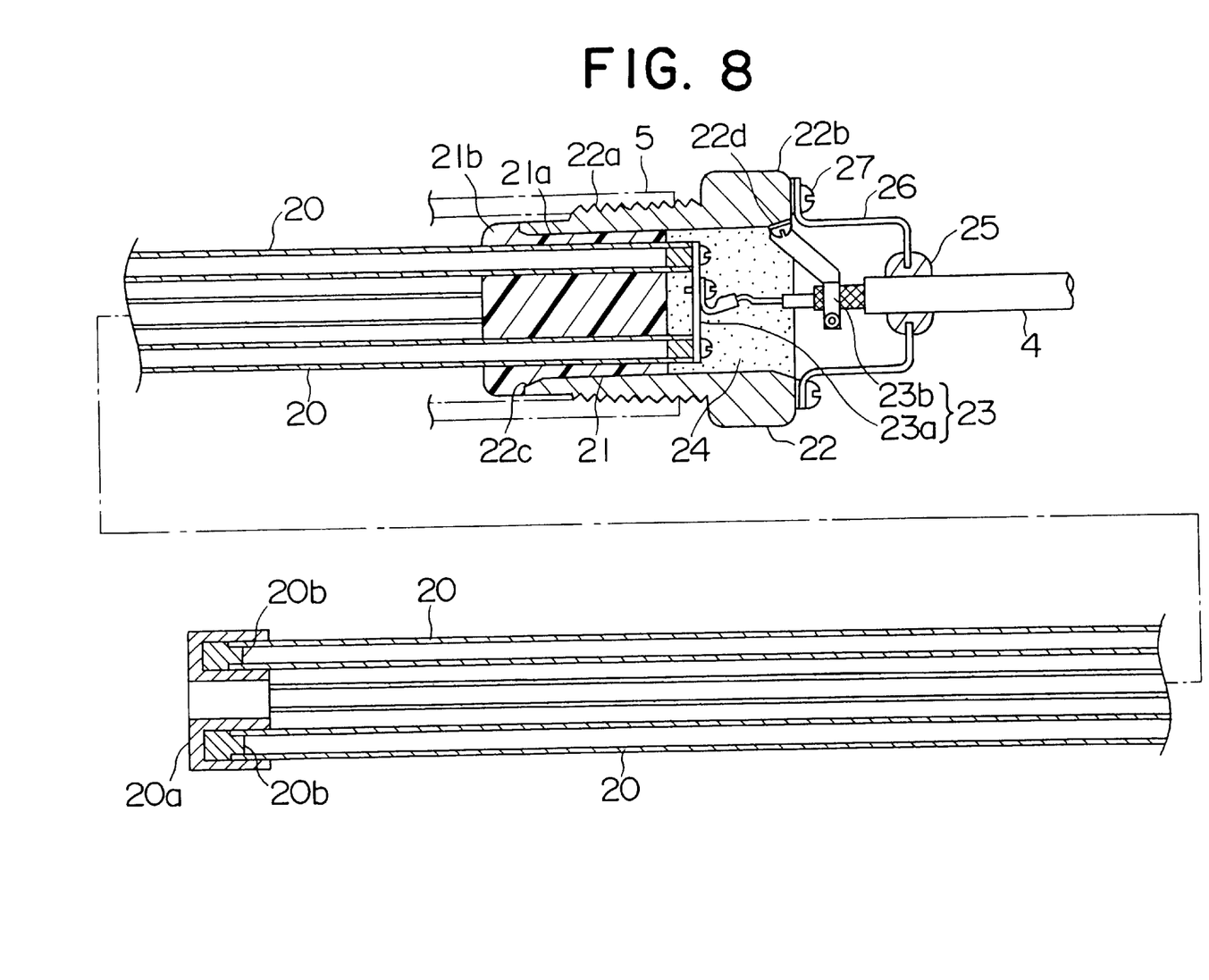
FIG. 8 is a sectional view of the electrostatic treatment electrode of FIG. 6.

Second Embodiment (FIGS. 6 to 8)

The electrostatic treatment electrode 2 of the second embodiment comprises eight pieces of belt-shaped metal pipes 20, a resin block 21 which supports therethrough the metal pipes 20 to arrange them in parallel with one another and holds them. A metal boss 22 receives the resin block 21 therein. A connecting member 23a and a connecting line 23b form a connecting means 23 for connecting each rear end of the metal pipes which extend through the resin block 21 to a single high voltage cable 4, and filling resin 24 which fills up a space defined in the rear portion of the boss 22 for fixing the rear portions of the metal pipes in an insulating state.

The metal pipes 20 are formed of a metal having a good conductivity such as an aluminum alloy and stainless steel like the metal plates 10. The metal pipes 20 are coated with an insulating film (not shown) at the surfaces thereof, and a ring-shaped connection cap 20a is attached to the tip ends of the metal pipes 20 so as to connect the metal pipes 20 with one another. The insulating film is formed of a tube made of a material like that of the first embodiment. Stoppers 20b made of resin like the protection cap 20a are inserted into the tip ends of the metal pipes 20, then the tube is subjected to a heat contraction while each metal pipe 20 is covered with the tube. The tip ends of the metal pipes 20 are heat-sealed or bonded upon completion of the heat contraction. Then the metal pipes 20 are covered with the protection cap 20a made of the same material as the first embodiment by way of an adhesive made of epoxy resin (EP), then they are connected to one another.

Eight through holes are defined in the resin block 21, which is made of the same material as the resin block 11 and through which the metal pipes 20 coated with the insulating film are inserted without generating a gap between these holes and the metal pipes 20. After the eight metal pipes 20 are inserted into the through holes, the rear ends of the metal pipes 20 are fixed and electrically connected to one another by the connecting member 23a, and the tip end of the cable 4 is connected to the connecting member 23a.

The boss 22 is formed of the same material as the boss 12, and a tapered screw 22a and a hexagonal screw head 22b are provided at the outer periphery thereof. The metal pipes 20 of the electrostatic treatment electrode are inserted into the socket 5 which is secured to the elbow portion of the pipe 1 by welding, etc., and the screw portion 22a is screwed into the male screw provided on the inner surface of the socket 5, thereby fixing the electrostatic treatment electrode 2 to the socket 5.

The resin block 21 is greater than the resin block 11 in the axial direction thereof, and it has an outer diameter insertion portion 21a which is slightly greater than the inner diameter of the boss 22 and a large diameter cap portion 21b which is provided at the back of the insertion portion 21a. Accordingly, when the insertion portion 21a is inserted into the boss 22 in a predetermined direction, the resin block 21 firmly engages in the boss 22 in a state where the cap portion 21b is brought into contact with the tip end of the boss 22 like in the first embodiment. The boss 22 has a tapered cut expansion portion 22c at the tip end thereof for facilitating the insertion of the resin block 21.

After the resin block 21 having the metal pipes 20 engages in the boss 22 so as to fix the former to the latter, the filling resin 24, such as epoxy resin (EP), is filled therein so as to fix the rear ends of the metal pipes 20 together with the connecting member 23a while they are insulated from one another. A rubber 25 and a casing 26 are provided to clamp the high voltage cable 4 by way of screws 27 for fixing the high voltage cable 4 to the boss 22. Denoted by 22d in FIG. 8 is a tapered cut expansion portion for preventing the filling resin 24 integrated with the resin block 21 and metal pipes 20 from coming off.

Although the present invention has been explained with reference to the first and second embodiments, it is not limited these embodiments but can be properly modified in design within the scope of the claims. For example, although the electrostatic treatment electrode is formed of the metal plates or metal pipes as the elongate members, it may be formed of a metal rod or formed as a modified shape of the metal plate or metal pipes of the first and second embodiments. A flat cable shaped member having a conducting wire such as piano wires may be used as elongate members provided with insulating films.

As mentioned above, according to the electrostatic treatment electrode of the present invention, the electrostatic treatment effect can be exerted largely since the number of elongate members to be used is increased to increase the entire surface area. Further, the resistance of the elongate members in fluid is sharply reduced compared with the conventional pipe-shaped electrostatic treatment electrode, thereby putting no burden on a pump for supplying fluid, so that a large-scaled electrostatic treatment electrode can be provided in the small diameter pipe. Further, since the elongate members are disposed in parallel with the flow of fluid, the flow of fluid is rectified so that the water treatment performance can be enhanced. Still further, the manufacturing cost can be reduced because of a single structure where the elongate members are merely held by resin.

What is claimed is:

1. An electrostatic treatment electrode comprising:

a plurality of metal elongate members each having an insulating film;

a block which receives one end of said elongate members therethrough to support said elongate members in parallel and insulated from one another;

a boss for supporting said block therein;

a connecting means for electrically connecting said one end of each of said elongate members to a voltage power source; and a protection cap for supporting and insulating another end of each of said elongate members with respect to each other without support from an inner wall of a pipe or container.

2. The electrostatic treatment electrode of claim 1, wherein said block comprises a resin block and said boss comprises a metal boss.

3. The electrostatic treatment electrode of claim 1, further comprising a filling resin for filling an interior of said boss to support and to insulate the one end of each of said elongate members.

4. The electrostatic treatment electrode of claim 1, wherein said boss comprises a metal boss including threads for inserting said electrostatic treatment electrode into an elbow portion of a pipe.

5. The electrostatic treatment electrode of claim 1, wherein said protection cap includes a plurality of openings for respectively receiving said elongate members and wherein the protection cap is attached to the other ends of said elongate members by an adhesive.

* * * * *